US012480071B2

(12) United States Patent
Bakken et al.

(10) Patent No.: US 12,480,071 B2
(45) Date of Patent: Nov. 25, 2025

(54) ACIDIC ANTIMICROBIAL MULTI-PURPOSE CLEANER WITH A SULFONATE ANIONIC SURFACTANT AND PHENOXYETHANOL MIXTURE

(71) Applicant: ECOLAB USA INC., Saint Paul, MN (US)

(72) Inventors: Amanda Bakken, Saint Paul, MN (US); Mark D. Levitt, Saint Paul, MN (US); Avila Abelseth, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 0 days.

(21) Appl. No.: 18/400,325

(22) Filed: Dec. 29, 2023

(65) Prior Publication Data

US 2024/0132803 A1 Apr. 25, 2024

Related U.S. Application Data

(63) Continuation of application No. 17/656,512, filed on Mar. 25, 2022, now Pat. No. 11,891,586, which is a continuation of application No. 16/846,850, filed on Apr. 13, 2020, now Pat. No. 11,312,922.

(60) Provisional application No. 62/833,208, filed on Apr. 12, 2019.

(51) Int. Cl.
*C11D 1/22* (2006.01)
*C11D 3/20* (2006.01)
*C11D 3/33* (2006.01)
*C11D 3/43* (2006.01)

(52) U.S. Cl.
CPC .............. *C11D 1/22* (2013.01); *C11D 3/2065* (2013.01); *C11D 3/33* (2013.01); *C11D 3/43* (2013.01)

(58) Field of Classification Search
CPC ......... C11D 1/143; C11D 1/22; C11D 3/0094; C11D 3/042; C11D 3/2068; C11D 3/33; C11D 3/43; C11D 3/48; C11D 7/265; C11D 7/50
See application file for complete search history.

(56) References Cited

U.S. PATENT DOCUMENTS 5,080,831 A 1/1992 VanEenam
5,158,710 A 10/1992 VanEenam
5,585,341 A 12/1996 Van Eenam
5,750,482 A 5/1998 Cummings
5,872,111 A 2/1999 Au et al.
6,221,823 B1 * 4/2001 Crisanti ................ C11D 3/046 510/238
6,346,508 B1 2/2002 Leonard et al.
6,423,677 B1 7/2002 Van Eenam
6,472,027 B1 10/2002 Olson et al.
6,495,506 B1 12/2002 Massaux et al.
6,656,456 B2 12/2003 Dodd et al.
6,699,825 B2 3/2004 Rees et al.
6,812,196 B2 11/2004 Rees et al.
6,936,579 B2 8/2005 Urban
7,262,042 B2 8/2007 Weber et al.
7,300,782 B2 11/2007 Breves et al.
7,319,112 B2 1/2008 Haught et al.
7,320,887 B2 1/2008 Kottwitz et al.
7,439,403 B2 10/2008 Hölscher
7,449,187 B2 11/2008 Weber et al.
7,498,051 B2 3/2009 Man et al.
7,569,226 B2 8/2009 Weber et al.
7,615,526 B2 11/2009 Hoelscher
7,803,604 B2 9/2010 Breves et al.
7,807,616 B2 10/2010 Meine et al.
7,811,076 B2 10/2010 Wieland et al.
7,846,886 B2 12/2010 Oertling et al.
7,888,104 B2 2/2011 Kottwitz et al.
7,897,554 B2 3/2011 Kessler et al.
7,985,570 B2 7/2011 Wieland et al.
7,998,919 B2 8/2011 Rong et al.
8,044,011 B2 10/2011 Warkotsch et al.
8,080,401 B2 12/2011 Bessler et al.
8,147,854 B2 4/2012 Okawa et al.
8,202,372 B2 6/2012 Warkotsch et al.
8,222,197 B2 7/2012 Fernandez Prieto et al.
8,246,906 B2 8/2012 Hei et al.
(Continued)

FOREIGN PATENT DOCUMENTS

AU 200069228 B2 3/2001
AU 200131990 A1 8/2001
(Continued)

OTHER PUBLICATIONS

Hashimoto et al., "Dispersion Granulation Method Leveraging pH Responsiveness of Monoalkyl Sulfosuccinate", Journal of Oleo Science, vol. 64, No. 2, pp. 191-196, 2015.
Ittehad Chemicals Limited, "Material Safety Data Sheet (MSDS)—Linear Alkyl Benzene Sulfonic Acid (LABSA)", Doc. No. LABSA-MSDS-08, 7 pages, 2019.
Lanxess Energizing Chemistry, "Safety Data Sheet", Mersolat H 30, 35 pages, 2017.
Stepan Company, "Material Safety Data Sheet", Bio-Soft S-101, 5 pages, 2014.
(Continued)

*Primary Examiner* — Charles I Boyer
(74) *Attorney, Agent, or Firm* — McKee, Voorhees & Sease, PLC

(57) ABSTRACT

The present disclosure relates to multi-purpose cleaning compositions, methods of manufacturing the multi-purpose cleaning compositions, and methods of using the multi-purpose cleaning compositions to clean a surface. Beneficially the multi-purpose cleaning compositions are capable of removing soil and providing antimicrobial activity. The compositions are especially useful on hard surfaces and are preferably low streaking.

17 Claims, 2 Drawing Sheets

(56) References Cited

U.S. PATENT DOCUMENTS

| | | | |
|---|---|---|---|
| 8,277,733 B2 | 10/2012 | McSherry et al. | |
| 8,309,507 B2 | 11/2012 | Fernandez Prieto et al. | |
| 8,383,566 B2* | 2/2013 | Zhu | C11D 3/042 510/505 |
| 8,389,466 B2 | 3/2013 | Panten et al. | |
| 8,580,549 B2 | 11/2013 | Michels et al. | |
| 8,591,958 B2 | 11/2013 | Omidbakhsh | |
| 8,669,216 B2 | 3/2014 | Zhu | |
| 8,778,862 B2 | 7/2014 | Hernandez et al. | |
| 8,883,848 B2 | 11/2014 | Bolduc et al. | |
| 8,987,182 B2 | 3/2015 | Warkotsch et al. | |
| 8,999,913 B2 | 4/2015 | Hölscher et al. | |
| 9,045,714 B2 | 6/2015 | Oertling et al. | |
| 9,109,068 B2 | 8/2015 | Rodrigues et al. | |
| 9,157,048 B2 | 10/2015 | Hölscher | |
| 9,163,226 B2 | 10/2015 | Wieland et al. | |
| 9,186,642 B2 | 11/2015 | Dihora et al. | |
| 9,221,028 B2 | 12/2015 | Dihora | |
| 9,271,494 B2 | 3/2016 | Pedersen et al. | |
| 9,282,746 B2 | 3/2016 | Amin et al. | |
| 9,314,524 B2 | 4/2016 | Qasem et al. | |
| 9,340,751 B2 | 5/2016 | Hölscher et al. | |
| 9,353,361 B2 | 5/2016 | Bessler et al. | |
| 9,458,414 B2 | 10/2016 | Rieth et al. | |
| 9,492,368 B2 | 11/2016 | Ishihara et al. | |
| 9,518,246 B2 | 12/2016 | Tachikawa et al. | |
| 9,644,171 B2 | 5/2017 | Hölscher | |
| 9,714,396 B2 | 7/2017 | Feng et al. | |
| 9,725,681 B2 | 8/2017 | Peters et al. | |
| 9,725,686 B2 | 8/2017 | Hochkugler et al. | |
| 9,831,088 B2 | 11/2017 | Chen | |
| 10,017,720 B2 | 7/2018 | Li et al. | |
| 10,058,498 B2 | 8/2018 | Hurkens et al. | |
| 10,085,925 B2 | 10/2018 | Lei et al. | |
| 10,138,117 B2 | 11/2018 | Chen et al. | |
| 10,176,979 B2 | 1/2019 | Liu et al. | |
| 10,238,108 B2 | 3/2019 | Griese et al. | |
| 11,312,922 B2 | 4/2022 | Bakken et al. | |
| 2002/0014178 A1 | 2/2002 | Haught et al. | |
| 2002/0187914 A1 | 12/2002 | Massaux et al. | |
| 2002/0187918 A1* | 12/2002 | Urban | C11D 3/43 510/505 |
| 2003/0083219 A1* | 5/2003 | Rees | C11D 1/24 510/424 |
| 2003/0216283 A1 | 11/2003 | Ishida et al. | |
| 2005/0009167 A1 | 1/2005 | Weber et al. | |
| 2005/0026269 A1 | 2/2005 | Kottwitz et al. | |
| 2005/0049165 A1 | 3/2005 | Kottwitz et al. | |
| 2006/0100128 A1* | 5/2006 | McCue | C11D 3/2086 510/505 |
| 2006/0241010 A1 | 10/2006 | Boone et al. | |
| 2007/0128129 A1 | 6/2007 | Stehr et al. | |
| 2007/0231295 A1 | 10/2007 | Hoppe et al. | |
| 2008/0050398 A1 | 2/2008 | Bockmuehl et al. | |
| 2008/0194715 A1 | 8/2008 | Wendel et al. | |
| 2008/0207481 A1 | 8/2008 | Meine et al. | |
| 2008/0293612 A1 | 11/2008 | Kellar et al. | |
| 2009/0081755 A1 | 3/2009 | Schmiedel et al. | |
| 2009/0162308 A1 | 6/2009 | Kuhn et al. | |
| 2009/0170745 A1 | 7/2009 | Merkel | |
| 2009/0214606 A1 | 8/2009 | Bujard et al. | |
| 2009/0238889 A1 | 9/2009 | Weide et al. | |
| 2009/0275493 A1 | 11/2009 | Siegert et al. | |
| 2010/0196287 A1 | 8/2010 | O'Connell et al. | |
| 2010/0233146 A1 | 9/2010 | McDaniel | |
| 2010/0240752 A1* | 9/2010 | Dreilinger | C11D 3/2086 514/557 |
| 2010/0254928 A1 | 10/2010 | Yamazaki et al. | |
| 2011/0112006 A1 | 5/2011 | Cobb et al. | |
| 2011/0268778 A1 | 11/2011 | Dihora et al. | |
| 2011/0269210 A1 | 11/2011 | Yoon | |
| 2011/0269657 A1 | 11/2011 | Dihora et al. | |
| 2012/0035091 A9 | 2/2012 | DeDominicis et al. | |
| 2012/0171754 A1 | 7/2012 | Bessler et al. | |
| 2012/0232153 A1 | 9/2012 | Griese et al. | |
| 2012/0258126 A1 | 10/2012 | Scholler et al. | |
| 2012/0277140 A1 | 11/2012 | Kellar et al. | |
| 2013/0029894 A1 | 1/2013 | Bettiol et al. | |
| 2013/0156708 A1 | 6/2013 | Pesaro et al. | |
| 2013/0229895 A1 | 9/2013 | Shiroishi et al. | |
| 2013/0239313 A1 | 9/2013 | Schiedel et al. | |
| 2013/0313154 A1 | 11/2013 | Hernandez et al. | |
| 2014/0113001 A1 | 4/2014 | Ramirez et al. | |
| 2014/0135245 A1 | 5/2014 | Annaheim et al. | |
| 2014/0342972 A1 | 11/2014 | Smets et al. | |
| 2014/0369953 A1 | 12/2014 | Purschwitz et al. | |
| 2015/0250166 A1 | 9/2015 | Goldblum et al. | |
| 2016/0122846 A1 | 5/2016 | Korzenski et al. | |
| 2016/0130500 A1 | 5/2016 | Chen et al. | |
| 2016/0296459 A1 | 10/2016 | Sun et al. | |
| 2016/0298063 A1 | 10/2016 | Behr et al. | |
| 2016/0304817 A1 | 10/2016 | Fernandez Prieto et al. | |
| 2017/0002302 A1 | 1/2017 | Dihora et al. | |
| 2017/0087199 A1 | 3/2017 | Patron et al. | |
| 2017/0107462 A1 | 4/2017 | Frankenbach | |
| 2017/0240846 A1 | 8/2017 | Hunt, Jr. et al. | |
| 2017/0273877 A1 | 9/2017 | Sasaki et al. | |
| 2018/0037767 A1 | 2/2018 | Zhang et al. | |
| 2018/0042825 A1 | 2/2018 | Lei et al. | |
| 2018/0044615 A1 | 2/2018 | Som et al. | |
| 2018/0073006 A1 | 3/2018 | Babe et al. | |
| 2018/0112204 A1 | 4/2018 | Estell et al. | |
| 2018/0127683 A1 | 5/2018 | Levitt et al. | |
| 2018/0130706 A1 | 5/2018 | Chen et al. | |
| 2018/0153172 A1 | 6/2018 | Zlotkin | |
| 2018/0155660 A1 | 6/2018 | Reichert et al. | |
| 2018/0155910 A1 | 6/2018 | Reichert et al. | |
| 2018/0177189 A1 | 6/2018 | Kleine et al. | |
| 2018/0216092 A1 | 8/2018 | Alekseyev et al. | |
| 2018/0235893 A1 | 8/2018 | Zhang et al. | |
| 2018/0237761 A1 | 8/2018 | Babe et al. | |
| 2018/0303090 A1* | 10/2018 | Budhian | A61K 31/194 |
| 2018/0320158 A1 | 11/2018 | Bao et al. | |
| 2018/0355290 A1 | 12/2018 | Capeci et al. | |
| 2019/0090483 A1 | 3/2019 | Hanson et al. | |
| 2019/0270951 A1* | 9/2019 | Hardy | A61K 8/36 |

FOREIGN PATENT DOCUMENTS

| | | |
|---|---|---|
| AU | 2010281739 A1 | 5/2011 |
| AU | 2013205600 B2 | 8/2013 |
| AU | 2014202278 B2 | 5/2014 |
| CA | 1341240 C | 6/2001 |
| CA | 2522579 C | 11/2004 |
| CA | 2579752 C | 3/2006 |
| CN | 102016050 A | 4/2011 |
| CN | 102370979 B | 5/2013 |
| CN | 104974864 A | 10/2015 |
| CN | 103502446 B | 11/2016 |
| CN | 106715465 A | 5/2017 |
| CN | 107105749 A | 8/2017 |
| CN | 105062712 B | 1/2018 |
| CN | 105051174 B | 4/2018 |
| CN | 107960104 A | 4/2018 |
| CN | 108291212 A | 7/2018 |
| CN | 104204198 B | 9/2018 |
| DE | 10047481 A1 | 4/2002 |
| DE | 102008053883 A1 | 5/2010 |
| DE | 102011118016 A1 | 5/2013 |
| DE | 102012222764 A1 | 10/2013 |
| EP | 0256223 A1 | 2/1988 |
| EP | 1008296 A1 | 6/2000 |
| EP | 1257353 B1 | 11/2004 |
| EP | 1326956 B1 | 2/2005 |
| EP | 1414977 B1 | 1/2008 |
| EP | 0904343 B2 | 7/2009 |
| EP | 2097059 B1 | 4/2012 |
| EP | 1730600 B1 | 1/2016 |
| EP | 2414495 B1 | 2/2016 |
| EP | 2638137 B1 | 8/2017 |
| EP | 2478097 B1 | 11/2017 |
| EP | 2494025 B1 | 4/2018 |
| GB | 773495 | 4/1957 |

(56) References Cited

FOREIGN PATENT DOCUMENTS

| | | | |
|---|---|---|---|
| GB | 2123005 | A | 1/1984 |
| GB | 2354771 | A | 4/2001 |
| IN | 200300163 | | 8/2003 |
| IN | 163CHENP2003 | | 4/2005 |
| IN | 200807302 | | 9/2008 |
| IN | 201002423 | | 10/2010 |
| IN | 20113627 | | 9/2012 |
| IN | 2012440 | | 4/2013 |
| IN | 20122262 | | 5/2013 |
| IN | 201510288 | | 2/2016 |
| IN | 201510409 | | 2/2016 |
| IN | 201510710 | | 2/2016 |
| IN | 20134372 | | 6/2016 |
| IN | 20139370 | | 6/2016 |
| IN | 2009598 | | 8/2016 |
| IN | 201747032387 | | 9/2017 |
| JP | 7179892 | A | 7/1995 |
| JP | 2000178106 | A | 6/2000 |
| JP | 200247123 | A | 2/2002 |
| JP | 2006188448 | A | 7/2006 |
| JP | 2008106271 | A | 5/2008 |
| JP | 2008169375 | A | 7/2008 |
| JP | 20097470 | A | 1/2009 |
| JP | 4342177 | B2 | 10/2009 |
| JP | 201047711 | A | 3/2010 |
| JP | 2011116767 | A | 6/2011 |
| JP | 4857599 | B2 | 1/2012 |
| JP | 4920124 | B2 | 4/2012 |
| JP | 5275532 | B2 | 8/2013 |
| JP | 5513385 | B2 | 6/2014 |
| JP | 5586449 | B2 | 9/2014 |
| JP | 5613763 | B2 | 10/2014 |
| JP | 5777517 | B2 | 9/2015 |
| JP | 2016124965 | A | 7/2016 |
| JP | 6046588 | B2 | 12/2016 |
| JP | 6046589 | B2 | 12/2016 |
| JP | 6054469 | B2 | 12/2016 |
| JP | 2017122728 | A | 7/2017 |
| JP | 2017149982 | A | 8/2017 |
| JP | 6200485 | B2 | 9/2017 |
| JP | 6335873 | B2 | 5/2018 |
| JP | 6335874 | B2 | 5/2018 |
| JP | 6431102 | B2 | 11/2018 |
| KR | 1020050080805 | A | 8/2005 |
| KR | 1020160021445 | A | 2/2016 |
| KR | 101643965 | B1 | 7/2016 |
| KR | 101784028 | B1 | 10/2017 |
| WO | 9955813 | A1 | 11/1999 |
| WO | 0114507 | A1 | 3/2001 |
| WO | 0157174 | A1 | 8/2001 |
| WO | 0194513 | A1 | 12/2001 |
| WO | 0197513 | A2 | 12/2001 |
| WO | 0205643 | A2 | 1/2002 |
| WO | 0210356 | A3 | 2/2002 |
| WO | 0212423 | A2 | 2/2002 |
| WO | 03054177 | A2 | 7/2003 |
| WO | 03097105 | A1 | 11/2003 |
| WO | 2005118793 | A3 | 12/2005 |
| WO | 2006131689 | A1 | 12/2006 |
| WO | 2008003631 | A1 | 1/2008 |
| WO | 2008040619 | A1 | 4/2008 |
| WO | 2008128826 | A1 | 10/2008 |
| WO | 2009015951 | A1 | 2/2009 |
| WO | 2009053157 | A1 | 4/2009 |
| WO | 2009061379 | A2 | 5/2009 |
| WO | 2010037219 | A1 | 4/2010 |
| WO | 2011112886 | A1 | 9/2011 |
| WO | 2011112910 | A1 | 9/2011 |
| WO | 2012154498 | A2 | 11/2012 |
| WO | 2013068479 | A1 | 5/2013 |
| WO | 2013096045 | A1 | 6/2013 |
| WO | 2013177136 | A1 | 11/2013 |
| WO | 2016049398 | A1 | 3/2016 |
| WO | 2016205755 | A1 | 12/2016 |
| WO | 2017157772 | A1 | 9/2017 |
| WO | 2017157777 | A1 | 9/2017 |
| WO | 2017210295 | A1 | 12/2017 |
| WO | 2018118917 | A1 | 6/2018 |
| WO | 2018118950 | A1 | 6/2018 |
| WO | 2018169750 | A1 | 9/2018 |
| WO | 2018171872 | A1 | 9/2018 |
| WO | 2018204812 | A1 | 11/2018 |

OTHER PUBLICATIONS

Stepan Product Bulletin, Sulfonic 100, 2 pages, 2021.

International Searching Authority in connection with PCT/us2020/027900 filed Apr. 13, 2020, "The International Search Report and the Written Opinion of the International Searching Authority, or the Declaration", 14 pages, mailed Jul. 8, 2020.

BASF, "Trilon M—Biodegradable Chelate", Handout, 2 pages Apr. 2016.

* cited by examiner

ACIDIC ANTIMICROBIAL MULTI-PURPOSE CLEANER WITH A SULFONATE ANIONIC SURFACTANT AND PHENOXYETHANOL MIXTURE

CROSS-REFERENCE

This application is a Continuation Application of Non-provisional application U.S. Ser. No. 17/656,512 (U.S. Pat. No. 11,891,586), filed Mar. 25, 2022, which is a continuation application of U.S. Ser. No. 16/846,850 (U.S. Pat. No. 11,312,922), filed Apr. 13, 2020, which claims priority under 35 U.S.C. § 119 to U.S. Provisional Application Ser. No. 62/833,208 filed on Apr. 12, 2019, and entitled "ANTIMICROBIAL MULTI-PURPOSE CLEANER AND METHODS OF MAKING AND USING THE SAME,"; the entire contents of the patent and provisional application are hereby expressly incorporated herein by reference.

TECHNICAL FIELD

The disclosure relates to antimicrobial multi-purpose cleaning compositions and methods of making and using the same. In a preferred embodiment, the cleaner is low-streaking on glass.

BACKGROUND

Multi-purpose cleaners as the name implies are intended to be used on multiple types of surfaces. Often multi-purpose cleaners are employed for soil removal or antimicrobial efficacy. It is desirable to have a cleaner that provides both soil removal and antimicrobial efficacy; however, formulating a composition that provides good soil removal and antimicrobial properties has been difficult. Common cleaners that provide both soil removal and antimicrobial efficacy contain harsh chemicals such as bleach or hydrogen peroxide. Such harsh chemicals limit the uses of the cleaning compositions and can necessitate the use of personal protective equipment (PPE), venting, or other safety measures.

Accordingly, it is an objective of the present disclosure to provide multi-purpose cleaning compositions that can provide both soil removal properties and antimicrobial efficacy.

Still a further object of the present disclosure is to provide multi-purpose cleaning compositions that do not require venting, PPE, or other safety measures.

Other objects, advantages and features of the present invention will become apparent from the following specification taken in conjunction with the accompanying figures.

BRIEF SUMMARY

An advantage of the antimicrobial multi-purpose cleaning compositions disclosed herein is that they provide improved cidal activity against a variety of bacteria and viruses while also providing improved soil removing. Another advantage of the antimicrobial multi-purpose cleaning compositions is that are low-streaking on glass surfaces.

A preferred embodiment, as described herein, comprises a concentrated multi-purpose cleaning composition comprising between about 1 wt. % and about 60 wt. % of an anionic sulfonated surfactant; between about 1 wt. % and about 30 wt. % of a solvent having a less than 5% (wt./wt.) solubility in water; a carrier; wherein the anionic sulfonated surfactant and solvent are in a ratio between about 3:1 and about 1:3; and wherein the composition has a pH of between about 0.5 and about 1.5.

A further embodiment, as described herein, comprises a ready-to-use multi-purpose cleaning composition comprising between about 0.01 wt. % and about 2 wt. % of an anionic sulfonated surfactant; between about 0.01 wt. % and about 2 wt. % of a solvent having a less than 5% (wt./wt.) solubility in water; between about 78 wt. % and about 96 wt. % of a carrier; wherein the composition has a pH of less than about 3.5; and wherein the composition provides at least about 3 log reduction in a microbial population in about 15 minutes or less.

Another preferred embodiment, as described herein, comprises a method of manufacturing a concentrated multipurpose composition comprising combining and mixing between about 1 wt. % and about 60 wt. % of an anionic sulfonated surfactant; between about 1 wt. % and about 30 wt. % of a solvent having a less than 5% (wt./wt.) solubility in water; and a carrier; wherein the anionic sulfonated surfactant and solvent are in a ratio between about 3:1 and about 1:3; and wherein the composition has a pH of between about 0.5 and about 1.5.

Still another preferred embodiment, as described herein, comprises a method of cleaning a surface comprising contacting a surface with a multi-purpose cleaning composition comprising between about 0.01 wt. % and about 2 wt. % of an anionic sulfonated surfactant; between about 0.01 wt. % and about 2 wt. % of a solvent having a less than 5% (wt./wt.) solubility in water; between about 78 wt. % and about 96 wt. % of a carrier; wherein the composition has a pH of less than about 3.5.

While multiple embodiments are disclosed, still other embodiments will become apparent to those skilled in the art from the following detailed description, which shows and describes illustrative embodiments of the invention. Accordingly, the figures and detailed description are to be regarded as illustrative in nature and not restrictive.

Figure 1:
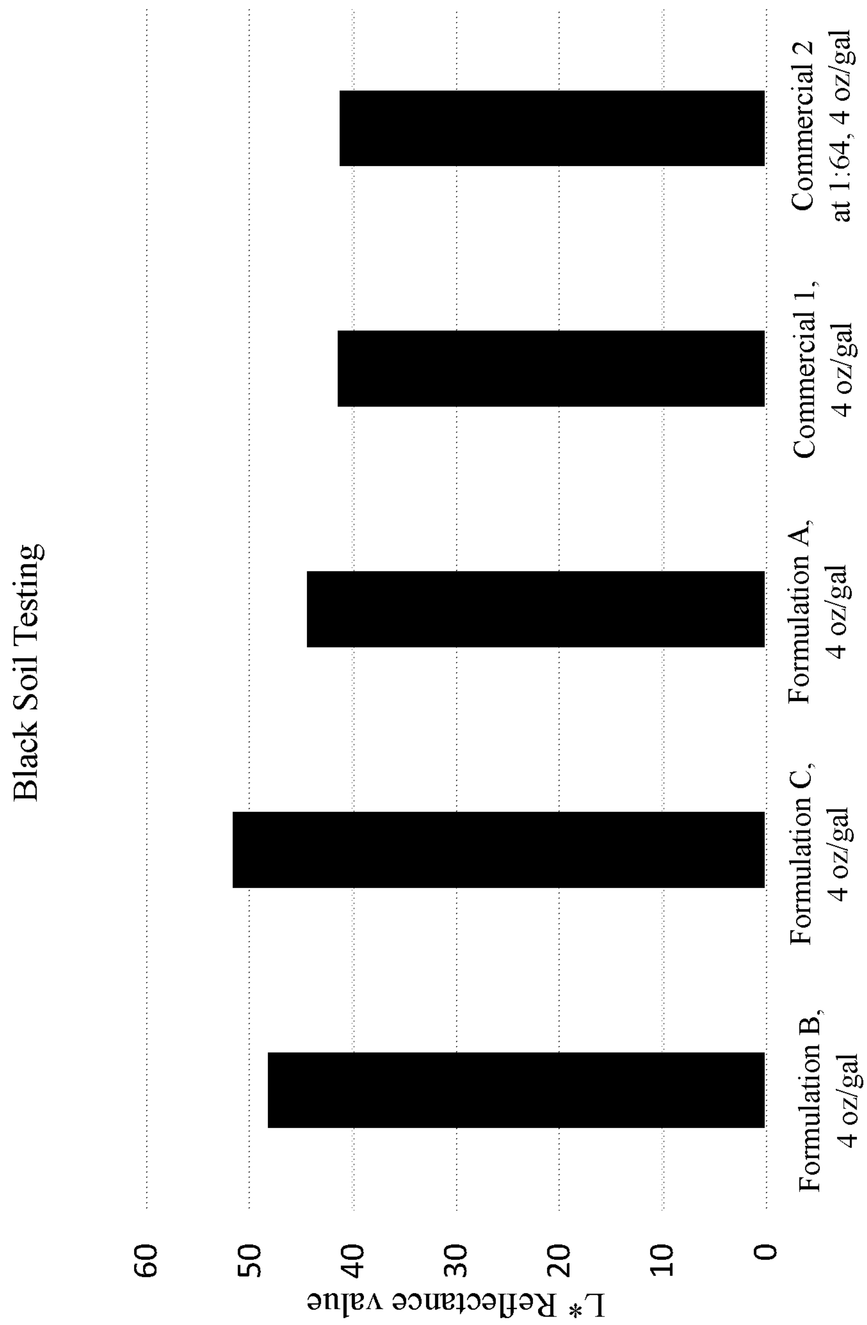
FIG. 1 is a graph comparing the assessing the cleaning performance of exemplary hard surface cleaner formulations of the invention on industrial hydrocarbon-based oily soils.

Various embodiments of the antimicrobial multi-purpose compositions and their methods of manufacture and use will be described in detail with reference to the figures. Reference to various embodiments does not limit the scope of the inventions. Figures represented herein are not limitations to the various embodiments according to the invention and are presented for exemplary illustration of the invention.

DETAILED DESCRIPTION OF THE PREFERRED EMBODIMENT

The present disclosure relates to stable, rapid-acting antimicrobial multi-purpose compositions, methods of making, and uses thereof. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾ This applies regardless of the breadth of the range.

Definitions

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring techniques and equipment, with respect to any quantifiable variable, including, but not limited to, mass, volume, time, temperature, pH, and log count of bacteria or viruses. Further, given solid and liquid handling procedures used in the real world, there is certain inadvertent error and variation that is likely through differences in the manufacture, source, or purity of the ingredients used to make the compositions or carry out the methods and the like. The term "about" also encompasses these variations. Whether or not modified by the term "about," the claims include equivalents to the quantities.

The methods and compositions of the present invention may comprise, consist essentially of, or consist of the components and ingredients of the present invention as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

The term "actives" or "percent actives" or "percent by weight actives" or "actives concentration" are used interchangeably herein and refers to the concentration of those ingredients involved in cleaning expressed as a percentage minus inert ingredients such as water or salts. It is also sometimes indicated by a percentage in parentheses, for example, "chemical (10%)."

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan. As used herein, the term "soil" or "stain" refers to a non-polar oily substance which may or may not contain particulate matter such as mineral clays, sand, natural mineral matter, carbon black, graphite, kaolin, environmental dust, etc.

As used herein, the term "antimicrobial" refers to a compound or composition that reduces and/or inactivates a microbial population, including, but not limited to bacteria, viruses, fungi, and algae within about 10 minutes or less. Preferably, the term antimicrobial refers to a composition that provides at least about a 3-log reduction of a microbial population in about 10 minutes or less, more preferably at least about a 3.5-log reduction in a microbial population in about 10 minutes or less, most preferably at least about a 4-log reduction of a microbial population in about 10 minutes or less.

As used herein, the term "cleaning" refers to a method used to facilitate or aid in soil removal, bleaching, microbial population reduction, and any combination thereof. As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

As used herein, the phrase "food processing surface" refers to a surface of a tool, a machine, equipment, a structure, a building, or the like that is employed as part of a food processing, preparation, or storage activity. Examples of food processing surfaces include surfaces of food processing or preparation equipment (e.g., slicing, canning, or transport equipment, including flumes), of food processing wares (e.g., utensils, dishware, wash ware, and bar glasses), and of floors, walls, or fixtures of structures in which food processing occurs. Food processing surfaces are found and employed in food anti-spoilage air circulation systems, aseptic packaging sanitizing, food refrigeration and cooler cleaners and sanitizers, ware washing sanitizing, blancher cleaning and sanitizing, food packaging materials, cutting board additives, third-sink sanitizing, beverage chillers and warmers, meat chilling or scalding waters, autodish sanitizers, sanitizing gels, cooling towers, food processing antimicrobial garment sprays, and non-to-low-aqueous food preparation lubricants, oils, and rinse additives.

The term "hard surface" refers to a solid, substantially non-flexible surface such as a counter top, tile, floor, wall, panel, window, plumbing fixture, kitchen and bathroom furniture, appliance, engine, circuit board, dish, minor, window, monitor, touch screen, and thermostat. Hard surfaces are not limited by the material; for example, a hard surface can be glass, metal, tile, vinyl, linoleum, composite, wood, plastic, etc. Hard surfaces may include for example, health care surfaces and food processing surfaces.

As used herein, the phrase "health care surface" refers to a surface of an instrument, a device, a cart, a cage, furniture, a structure, a building, or the like that is employed as part of a health care activity. Examples of health care surfaces include surfaces of medical or dental instruments, of medical or dental devices, of electronic apparatus employed for monitoring patient health, and of floors, walls, or fixtures of structures in which health care occurs. Health care surfaces are found in hospital, surgical, infirmity, birthing, mortuary, and clinical diagnosis rooms. These surfaces can be those typified as "hard surfaces" (such as walls, floors, bed-pans, etc.), or fabric surfaces, e.g., knit, woven, and non-woven surfaces (such as surgical garments, draperies, bed linens, bandages, etc.), or patient-care equipment (such as respirators, diagnostic equipment, shunts, body scopes, wheel chairs, beds, etc.), or surgical and diagnostic equipment. Health care surfaces include articles and surfaces employed in animal health care.

As used herein, the term "instrument" refers to the various medical or dental instruments or devices that can benefit from cleaning with a composition according to the present invention.

As used herein, the phrases "medical instrument," "dental instrument," "medical device," "dental device," "medical equipment," or "dental equipment" refer to instruments, devices, tools, appliances, apparatus, and equipment used in medicine or dentistry. Such instruments, devices, and equipment can be cold sterilized, soaked or washed and then heat sterilized, or otherwise benefit from cleaning in a composition of the present invention. These various instruments, devices and equipment include, but are not limited to: diagnostic instruments, trays, pans, holders, racks, forceps, scissors, shears, saws (e.g. bone saws and their blades), hemostats, knives, chisels, rongeurs, files, nippers, drills, drill bits, rasps, burrs, spreaders, breakers, elevators, clamps, needle holders, carriers, clips, hooks, gouges, curettes, retractors, straightener, punches, extractors, scoops, keratomes, spatulas, expressers, trocars, dilators, cages, glassware, tubing, catheters, cannulas, plugs, stents, scopes (e.g., endoscopes, stethoscopes, and arthroscopes) and related equipment, and the like, or combinations thereof.

As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

As used herein, the term "soft surface" refers to surfaces not classified as hard surfaces, but which are solid surfaces. Soft surfaces, include, but are not limited to, textiles, fabrics, woven surfaces, and non-woven surfaces. Soft surfaces, include, but are not limited to, carpet, curtains, fabrics, hospital partitions, linens, and upholstery.

As used herein, the term "substantially free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "virus", as used herein refers to a type of microorganism that can include both pathogenic and non-pathogenic viruses. Pathogenic viruses can be classified into two general types with respect to the viral structure: enveloped viruses and non-enveloped viruses. Some well-known enveloped viruses include herpes virus, influenza virus; paramyxovirus, respiratory syncytial virus, corona virus, HIV, hepatitis B virus, hepatitis C virus and SARS-CoV virus. Non-enveloped viruses, sometimes referred to as "naked" viruses, include the families Picornaviridae, Reoviridae, Caliciviridae, Adenoviridae and Parvoviridae. Members of these families include rhinovirus, poliovirus, adenovirus, hepatitis A virus, norovirus, papillomavirus, and rotavirus. It is known in the art that "enveloped" viruses are relatively sensitive and, thus, can be inactivated by commonly used disinfectants. In contrast, non-enveloped viruses are substantially more resistant to conventional disinfectants and are significantly more environmentally stable than enveloped viruses.

As used herein, the term "ware" refers to items such as eating and cooking utensils, dishes, and other hard surfaces such as showers, sinks, toilets, bathtubs, countertops, windows, mirrors, transportation vehicles, and floors. As used herein, the term "warewashing" refers to washing, cleaning, or rinsing ware. Ware also refers to items made of plastic. Types of plastics that can be cleaned with the compositions according to the invention include but are not limited to, those that include polypropylene polymers (PP), polycarbonate polymers (PC), melamine formaldehyde resins or melamine resin (melamine), acrylonitrile-butadiene-styrene polymers (ABS), and polysulfone polymers (PS). Other exemplary plastics that can be cleaned using the compounds and compositions of the invention include polyethylene terephthalate (PET) polystyrene polyimide.

The terms "water soluble" and "water dispersible" as used herein, means that the ingredient is soluble or dispersible in water in the inventive compositions. In general, the ingredient should be soluble or dispersible at 25° C. concentration of between about 0.1 wt. % and about 15 wt. % of the water, more preferably at a concentration of between about 0.1 wt. % and about 10 wt. %.

The term "weight percent," "wt. %," "wt-%," "percent by weight," "% by weight," and variations thereof, as used herein, refer to the concentration of a substance as the weight of that substance divided by the total weight of the composition and multiplied by 100.

Compositions

The compositions according to the present application may be as liquid concentrates or ready to use solutions. The desired concentration for a ready-to-use solution may be dependent on its end-use and application. Further, it should be understood that the concentrates may vary in their concentration based on the end dilution ratio and whether the concentrate is formulated as an anhydrous or aqueous formulation.

The pH of the compositions may range from about 5 to about 0, preferably between about 0.5 and about 3.5 and all ranges therebetween. In a concentrated composition, the pH is preferably between about 0 and about 2, more preferably between about 0.5 and about 1.5. In a ready-to-use composition, the pH is preferably between about 1 and about 3.2, more preferably between about 1.5 and about 3, most preferably between about 2 and about 2.5. In an embodiment comprising a carrier, the carrier is preferably water or a water miscible solvent.

In a preferred embodiment, the compositions have less than 1 wt. % of an oxidizer, preferably less than 0.5 wt. % oxidizer, more preferably less than 0.1 wt. % oxidizer, most preferably less than 0.01 wt. % oxidizer. In a preferred embodiment, the compositions are free of an oxidizer. Oxidizers include, but are not limited to, peroxides.

Preferred concentrated compositions can be prepared according to Table 1A and preferred ready-to-use compositions can be prepared according to Table 1B. The compositions described in Tables 1A-1B are provided in active concentration on a weight basis.

TABLE 1A

| Component | Exemplary Range 1 w/w % | Exemplary Range 2 w/w % | Exemplary Range 3 w/w % |
|---|---|---|---|
| Anionic Surfactant | 1-60 | 5-50 | 7-40 |
| Buffering Agent | 0-20 | 0.01-15 | 0.01-10 |
| Carrier | 0-q.s. | 0.1-60 | 5-45 |
| Chelant | 0-10 | 0.1-7 | 0.5-5 |
| Defoaming Agent | 0-10 | 0.01-7 | 0.01-5 |
| Dye | 0-0.2 | 0.001-0.2 | 0.001-0.1 |
| Fragrance | 0-1 | 0.1-0.7 | 0.2-0.5 |
| pH Modifier | 0-10 | 0.01-8 | 0.01-5 |
| Solvent | 1-30 | 2-20 | 5-10 |
| Optional Lubricant | 0-20 | 1-20 | 3-12 |
| Optional Additional Surfactant | 0-20 | 0.01-15 | 0.01-10 |
| Additional Optional Ingredients | 0-20 | 0.01-15 | 0.01-12 |

TABLE 1B

| Component | Exemplary Range 1 w/w % | Exemplary Range 2 w/w % | Exemplary Range 3 w/w % |
|---|---|---|---|
| Anionic Surfactant | 0.01-2 | 0.05-1.5 | 0.1-1 |
| Buffering Agent | 0-3 | 0.01-3 | 0.01-3 |
| Carrier | 0-q.s. | q.s. | q.s. |
| Chelant | 0-1 | 0.001-1 | 0.01-0.5 |
| Defoaming Agent | 0-2 | 0.01-1 | 0.01-0.5 |
| Dye | 0-0.1 | 0.0001-0.05 | 0.0001-0.01 |
| Fragrance | 0-0.1 | 0.001-0.05 | 0.001-0.005 |
| pH Modifier | 0-10 | 0.01-5 | 0.01-3 |
| Solvent | 0.01-2 | 0.05-1.5 | 0.1-1 |
| Optional Lubricant | 0-1 | 0.05-1 | 0.1-0.5 |
| Optional Additional Surfactant | 0-10 | 0.01-5 | 0.01-3 |
| Optional Additional Ingredients | 0-10 | 0.01-10 | 0.01-5 |

Surprisingly, the antimicrobial multi-purpose compositions of the present application have a ratio of anionic surfactant to solvent is between about 3:1 and about 1:3, more preferably between about 3:1 and about 1:1, most preferably about 2:1. Preferably, the compositions have a viscosity of less than about 1000 cps. Preferably, the compositions are foaming. Although in certain embodiments, it may be preferable for the compositions to be low-foaming; in such an embodiment, the compositions can comprise a defoaming agent.

In a preferred embodiment, the antimicrobial multi-purpose compositions provide at least about a 3-log reduction of a microbial population, more preferably at least about a 3.5-log reduction, most preferably equal to or greater than about 4-log reduction. Preferably, the antimicrobial multi-purpose compositions provide these reductions in about 30 minutes or less, about 20 minutes or less, about 15 minutes or less, about 10 minutes or less, about 5 minutes or less, about 4 minutes or less, or even about 3 minutes or less.

The antimicrobial multi-purpose compositions may include concentrate compositions which can be diluted to form use compositions or ready-to-use (RTU) compositions. Beneficially, the compositions overcome a limitation of the prior art in that dilutable concentrates can be provided. In general, a concentrate refers to a composition that is intended to be diluted with water to provide a use solution that contacts an object to provide the desired cleaning, antimicrobial efficacy, or the like. The antimicrobial multi-purpose composition that contacts the articles can be referred to as a ready-to-use composition (or use solution) dependent upon the formulation employed in the methods described herein. It should be understood that the concentration of the anionic surfactant(s), solvents, and any additional functional ingredients, in the composition will vary depending on whether the composition is provided as a concentrate or as a use solution.

A use solution may be prepared from the concentrate by diluting the solid or liquid concentrate with water at a dilution ratio that provides a use solution having desired detersive properties. The water that is used to dilute the concentrate to form the use composition can be referred to as water of dilution or a diluent, and can vary from one location to another. In a preferred embodiment, the dilution of the concentrated compositions can be at a dilution of about 0.5 oz per gallon to about 16 oz per gallon.

The liquid compositions can be provided in various forms well appreciated by those skilled in the art. The compositions can also be manufactured to include a saturated antimicrobial wipe, such as a paper or cloth substrate having the liquid compositions saturated thereon.

Anionic Sulfonated Surfactants

In a preferred embodiment, the compositions comprise at least one anionic sulfonated surfactant. In a preferred embodiment, the concentrated antimicrobial multi-purpose composition comprises between about 1 wt. % and about 60 wt. %, more preferably between about 5 wt. % and about 50 wt. %, and most preferably between about 7 wt. % and about 40 wt. % of the anionic sulfonated surfactant. In a preferred embodiment, the ready-to-use antimicrobial multi-purpose composition comprises between about 0.01 wt. % and about 2 wt. %, more preferably between about 0.05 wt. % and about 1.5 wt. %, and most preferably between about 0.1 wt. % and about 1 wt. % of the anionic sulfonated surfactant.

Anionic surfactants are surface active substances which are categorized by the negative charge on the hydrophile; or surfactants in which the hydrophilic section of the molecule carries no charge unless the pH is elevated to the pKa or above (e.g. carboxylic acids). Carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and, calcium, barium, and magnesium promote oil solubility.

Preferred anionic sulfonated surfactants include alkyl sulfonates, the linear and branched primary and secondary alkyl sulfonates, and the aromatic sulfonates with or without substituents. In an aspect, sulfonates include sulfonated carboxylic acid esters. In an aspect, suitable alkyl sulfonate surfactants include C8-C22 alkylbenzene sulfonates, or C10-C22 alkyl sulfonates. In an exemplary aspect, the anionic alkyl sulfonate surfactant is linear alkyl benzene sulfonic acid (LAS). In a preferred embodiment employing LAS as the anionic surfactant, the compositions are most effective at pH 3.5 or below. In a further embodiment, the anionic sulfonate surfactant may alternatively or additionally include diphenylated sulfonates, and/or sulfonated oleic acid.

Most preferred anionic sulfonated surfactants include, but are not limited to, C8-C22 alkylbenzene sulfonates, sulfonated oleic acid, a sulfosuccinate, a secondary alkane sulfonate, or mixtures thereof.

In an embodiment, the antimicrobial multi-purpose compositions of the present application may be substantially or entirely free of other surfactants including, amphoteric surfactants, cationic surfactants, nonionic surfactants, zwitterionic surfactants, or other anionic surfactants.

Buffering Agent

In a further aspect, the compositions and methods can optionally comprise a buffering agent. In a preferred embodiment, the composition employs a pH buffering agent with a pKa between about 2 and about 3. If a buffering agent is included in the compositions, it can be in any suitable amount to buffer the composition at a desired pH. In a preferred embodiment, the concentrated antimicrobial multi-purpose composition comprises between about 0 wt. % and about 20 wt. %, more preferably between about 0.01 wt. % and about 15 wt. %, and most preferably between about 0.01 wt. % and about 10 wt. % of a buffering agent. In a preferred embodiment, the ready-to-use antimicrobial multi-purpose composition comprises between about 0 wt. % and about 3 wt. %, more preferably between about 0.01 wt. % and about 3 wt. %, and most preferably between about 0.01 wt. % and about 3 wt. % of a buffering agent. In a preferred embodiment, the buffering agent is in an amount less than about 0.5 wt. %, more preferably less than about 0.1 wt. %.

Preferred buffering agents include, but are not limited to, phosphonates, phosphonic acids, and/or phosphates. Exemplary buffering agents include a phosphonate salt(s) and/or a heterocyclic dicarboxylic acid, e.g., dipicolinic acid. In some embodiments, the buffering agent is pyridine carboxylic acid-based stabilizers, such as picolinic acid and salts, pyridine-2,6-dicarboxylic acid and salts, and phosphonate-based stabilizers, such as phosphoric acid and salts, pyrophosphoric acid and salts and most commonly 1-hydroxyethylidene-1,1-diphosphonic acid (HEDP) and salts. In other embodiments, the compositions and methods can comprise two or more buffering agents, e.g., HEDP and 2,6-pyridinedicarboxylic acid (DPA). Further, exemplary buffering agents include, but are not limited to, triethanol amine, imidazole, a carbonate salt, a phosphate salt, heterocyclic carboxylic acids, phosphonates, etc. In a preferred embodiment, the composition is free of a carboxylic acid buffering agent.

pH Modifiers

The antimicrobial multi-purpose compositions of the present application can optionally include one or more pH modifiers to adjust pH and/or neutralize other ingredients. In a preferred embodiment, an alkaline pH modifier is added as an alkalizing agent. Preferably, an alkaline pH modifier is added to compositions comprising no chelant or a non-neutralized chelant. In a preferred embodiment, an acidic pH modifier is added to compositions comprising a neutralized chelant. In a preferred embodiment, an acidic pH modifier can be added as a coacidulant for disinfecting applications.

If a pH modifier is included in the compositions, it can be in any suitable amount to arrive at a desired pH. In a preferred embodiment, the concentrated antimicrobial multi-purpose composition comprises between about 0 wt. % and about 10 wt. %, more preferably between about 0.01 wt. % and about 8 wt. %, and most preferably between about 0.01 wt. % and about 5 wt. % of a pH modifier. In a preferred embodiment, the ready-to-use antimicrobial multi-purpose composition comprises between about 0 wt. % and about 10 wt. %, more preferably between about 0.01 wt. % and about 5 wt. %, and most preferably between about 0.01 wt. % and about 3 wt. % of a pH modifier.

Alkaline pH Modifier

The compositions may include one or more alkaline pH modifiers to adjust the compositions to a desired pH.

Suitable alkaline pH modifiers include, but are not limited to, one or more organic alkaline pH modifiers, one or more inorganic alkaline pH modifiers, or combinations thereof. Suitable organic alkaline pH modifiers include, but are not limited to, amines and strong nitrogen bases including, for example monoethanolamine, monopropanolamine, diethanolamine, dipropanolamine, triethanolamine, tripropanolamine, mixed isopropanolamines, and the like, or combinations thereof. Suitable inorganic alkaline pH modifiers include, but are not limited to, alkali metal hydroxides (e.g. sodium hydroxide, potassium hydroxide, or the like, or combinations thereof), alkali metal carbonates (e.g., sodium carbonate, potassium carbonate, sodium bicarbonate, potassium bicarbonate, sodium sesquicarbonate, potassium sesquicarbonate, and the like, or combinations thereof), alkali metal borates (e.g., sodium borate, potassium borate, and the like, or combinations thereof), alkali metal oxides (e.g., sodium oxide, potassium oxide, and the like, or combinations thereof), and the like, or combinations thereof. Examples of one or more alkaline pH modifiers include one or more of an alkanolamine and/or alkali metal carbonate.

A number of commercially available alkaline pH modifiers may be suitable for use in the antimicrobial multi-purpose compositions. Commercially available alkaline pH modifiers may include amino alcohols include, but are not limited to, primary amino alcohols (e.g. 2-Amino-2-methyl-1-propanol), amino alcohols (e.g. 2-Amino-2-methyl-1-propanol), commercially available alkyl alkanolamines including, but not limited to, monoethanolamine and triethanolamine.

In an aspect, the alkaline pH modifiers can include ethanolamines and/or carbonates. In a further preferred aspect, the alkaline pH modifiers include monoethanolamine, diethanolamine, triethanolamine, 2-amino-2-methyl-1-propanol, monoisopropanolamine, diisopropanolamine, 2-(2-Aminoethoxyl)ethanol (DGA) and/or an alkali metal carbonate. In a further preferred aspect, the alkaline pH modifiers do not include caustic, including for example, any alkali metal hydroxides. In still other preferred aspects, the alkaline pH modifiers do not include monoethanolamine, caustic and/or other highly alkaline components that result in an index value that require classification as a hazardous material, thereby requiring use of personal protective equipment (PPE) when handling the antimicrobial multi-purpose composition. In such preferred aspects, the alkaline pH modifiers monoethanolamine, caustic and/or other highly alkaline components are included at less than about 1 wt-% per component in a concentrate antimicrobial multi-purpose composition. In other aspects, such alkaline pH modifiers are excluded from the antimicrobial multi-purpose composition.

Acidic pH Modifier

The compositions may include an acidic pH modifier. In such an aspect, the acidic pH modifier can be a combination of a weak acid and a strong acid. Strong acids that can be used are acids which substantially dissociate an aqueous solution. "Weak" organic and inorganic acids are acids or acid components in which the first dissociation step of a proton from the acid moiety does not proceed essentially to completion when the acid is dissolved in water at ambient temperatures at a concentration within the range useful to form the present compositions.

Without wishing to be bound by theory, an acidic pH modifier are believed to affect the lipid envelope and/or capsid in the same manner. Moreover, the acidic pH modifiers disclosed herein facilitate the creation of a low pH buffer on the surface of a substrate, thereby prolonging the residual antimicrobial and antimicrobial activity of the compositions and products in which they are incorporated.

Exemplary strong acids suitable for use modifying the pH of the compositions include methane sulfonic acid, sulfuric acid, sodium hydrogen sulfate, phosphoric acid, phosphonic acid, nitric acid, sulfamic acid, hydrochloric acid, trichloroacetic acid, trifluoroacetic acid, toluene sulfonic acid, glutamic acid, and the like; alkane sulfonic acid, such as methane sulfonic acid, ethane sulfonic acid, linear alkyl benzene sulfonic acid, xylene sulfonic acid, cumene sulfonic acid and the like. In a preferred aspect, the compositions include a strong acid having a pKa less than about 2.5 to beneficially provide the acidic use compositions having a pH less than about 4, or preferably less than about 3. In an embodiment, the compositions include a strong acid in combination with the anionic surfactant, and optionally include a weak acid.

Exemplary weak acids suitable for use modifying the pH of the compositions include alpha hydroxycarboxylic acid, such as lactic acid, citric acid, tartaric acid, malic acid, gluconic acid, and the like; carboxylic acids, such as formic acid, acetic acid, propionic acid and the like; other common organic acids such as ascorbic acid, glutamic acid, levulinic acid, etc. could also be used. In a preferred aspect, the compositions include a weak acid having a pKa greater than about 2.5 to beneficially provide the acidic use compositions having a pH less than about 4, or preferably less than about 3. In an embodiment, the compositions include a weak acid in combination with the anionic surfactant, and optionally include a strong acid. In a preferred embodiment, the composition is free of mono-carboxylic acids, di-carboxylic acids, or both mono- and di-carboxylic acids.

In a preferred embodiment, the compositions can contain less than 0.5 wt. %, preferably less than about 0.1 wt. %, more preferably less than about 0.01 wt. %, and most preferably free of a carboxylic acid, a strong acid, a weak acid, a peracid, or mixture thereof.

Solvent

The antimicrobial multi-purpose compositions comprise an organic solvent. In a preferred embodiment, the concentrated antimicrobial multi-purpose composition comprises between about 1 wt. % and about 30 wt. %, more preferably between about 2 wt. % and about 20 wt. %, and most preferably between about 5 wt. % and about 10 wt. % of a solvent. In a preferred embodiment, the ready-to-use antimicrobial multi-purpose composition comprises between about 0.01 wt. % and about 2 wt. %, more preferably between about 0.05 wt. % and about 1.5 wt. %, and most preferably between about 0.1 wt. % and about 1 wt. % of a solvent.

In a preferred embodiment, the solvent is a hydrophobic oxygenated solvent. Exemplary solvents and solvent systems include limited water-solubility alcohols. In an aspect, a benzyl alcohol solvent and/or solvent system is employed. In a further aspect, a phenoxyethanol solvent and/or solvent system is employed. Without being limited to a particular mechanism of action, in some embodiments, the solvent provides a limited water solubility alcohol providing hydrophobicity that adds affinity towards greasy soils and acts as a plasticizer. In an embodiment, the solvent has a solubility in water of preferably less than 15% water soluble, more preferably less than 8% water soluble, and most preferable less than 5% water soluble. In a preferred embodiment, the composition only contains solvent with limited water solubility. In a preferred embodiment, the compositions can comprise both a solvent with limited water solubility and also a co-solvent having slightly more water solubility.

Additional suitable solvents and solvent systems may include one or more different solvents including aromatic alcohols, ether amines, amidines, esters, glycol ethers, and mixtures thereof. Representative glycol ether solvents may include aromatic glycol ether solvents, such as ethylene glycol phenyl ether (commercially available from Dow as Dowanol Eph) or diethylene glycol phenyl ether (commercially available as Dowanol DiEPh). Additional suitable glycol ether solvents may include, without limitation, Butyl CARBITOL™ acetate, Butyl CARBITOL™, Butyl CELLOSOLVE™ acetate, Butyl CELLOSOLVE™, Butyl DIPROPASOL™, Butyl PROPASOL™, CARBITOL™ PM-600, CARBITOL™ Low Gravity, CELLOSOLVE™, DOWANOL PPH™, DOWANOL TPnB™, EEP™, FILMER IBT™, Hexyl CARBITOL™, Hexyl CELLOSOLVE™, Methyl CARBITOL™, Methyl CELLOSOLVE™ acetate, Methyl CELLOSOLVE™, Methyl DIPROPASOL™, Methyl PROPASOL acetate, Methyl PROPASOL™, Propyl CARBITOL™, Propyl CELLOSOLVE™, Propyl DIPROPASOL™, and/or Propyl PROPASOL™.

Additional suitable solvents may include 1,8-Diazabicyclo[5.4.0]undec-7-ene, or also may be referred to as 2,3,4,6,7,8,9,10-Octahydropyrimidol[1,2-a]azepine (or DBU), 2.5.7.10-tetraoxaundecante (TOU), acetamidophenol, acetanilide, acetophenone, 2-acetyl-1-methylpyrrole, ethyl hexyl glycerine, benzyl acetate, benzyl alcohol, methyl benzyl alcohol, alpha phenyl ethanol, benzyl benzoate, benzyloxyethanol, ethylene glycol phenyl ether, a propylene glycol, propylene glycol phenyl ether, amyl acetate, amyl alcohol, 3-butoxyethyl-2-propanol, butyl acetate, n-butyl propionate, cyclohexanone, diacetone alcohol, diethoxyethanol, diethylene glycol methyl ether, diisobutyl carbinol, diisobutyl ketone, dimethyl heptanol, dipropylene glycol tert-butyl ether, 2-ethylhexanol, ethyl propionate, ethylene glycol methyl ether acetate, hexanol, isobutanol, isobutyl acetate, isobutyl heptyl ketone, isophorone, isopropanol, isopropyl acetate, methanol, methyl amyl alcohol, methyl n-amyl ketone, 2-methyl-1-butanol, methyl ethyl ketone, methyl isobutyl ketone, 1-pentanol, n-pentyl propionate, 1-propanol, n-propyl acetate, n-propyl propionate, propylene glycol ethyl ether, tripropylene glycol methyl ether, dipropylene glycol n-propyl ether, tripropylene glycol n-propyl ether, dipropylene glycol n-butyl ether, tripropylene glycol n-butyl ether, diethylene glycol n-butyl ether acetate, diethylene glycol monobutyl ether, ethylene glycol n-butyl ether acetate, ethylene glycol monobutyl ether, dipropylene glycol monobutyl ether, propylene glycol monobutyl ether, ethyl 3-ethoxypropionate, 2,2,4-Trimethyl-1,3-Pentanediol Monoisobutyrate, diethylene glycol monohexyl ether, ethylene glycol monohexyl ether, diethylene glycol monomethyl ether, diethylene glycol monoethyl ether, ethylene glycol methyl ether acetate, ethylene glycol monomethyl ether, dipropylene glycol monomethyl ether, propylene glycol methyl ether acetate, propylene glycol monomethyl ether, diethylene glycol monopropyl ether, ethylene glycol monopropyl ether, dipropylene glycol monopropyl ether and propylene glycol monopropyl ether. Representative dialkyl carbonates include dimethyl carbonate, diethyl carbonate, dipropyl carbonate, diisopropyl carbonate and dibutyl carbonate. Representative oils include benzaldehyde, pinenes (alphas, betas, etc.), terpineols, terpinenes, carvone, cinnamealdehyde, borneol and its esters, citrals, ionenes, jasmine oil, limonene, dipentene, linalool and its esters. Representative dibasic esters include dimethyl adipate, dimethyl succinate, dimethyl glutarate, dimethyl malonate, diethyl adipate, diethyl succinate, diethyl glutarate, dibutyl succinate, dibutyl glutarate and products available under the trade designations DBE, DBE-3, DBE-4, DBE-5, DBE-6, DBE-9, DBE-IB, and DBE-ME from DuPont Nylon. Representative phthalate esters include dibutyl phthalate, diethylhexyl phthalate and diethyl phthalate. Additional solvents include glycerin and glycerin mono alkyl ethers such as mono heptyl glycerin, and 1,2 alkane diols such as 1,2 octane diol.

In a preferred embodiment, the solvent is one or more of benzyl alcohol and/or a solvent from the Dowanol E series and/or Dowanol P series.

Lubricant

In a preferred embodiment, the compositions can optionally include a lubricant. A lubricant can be beneficial as it can increase the lubricity of the composition on surfaces. Preferred lubricants include, but are not limited to, glycerin, a glycerin mono alkyl ether, propylene glycol, or a combination thereof. In a most preferred embodiment, the compositions comprise glycerin, propylene glycol, or a mixture thereof. If a lubricant is added to a concentrated composition, it is preferably added in an amount between about 0 wt. % and about 20 wt. %, more preferably between about 1 wt. % and about 20 wt. %, still more preferably between about 5 wt. % and about 15 wt. %, and most preferably between about 3 wt. % and about 12 wt. %. If a lubricant is added to a ready-to-use composition, it is preferably added in an amount between about 0 wt. % and about 1 wt. %, more preferably between about 0.05 wt. % and about 1 wt. %, most preferably between about 0.1 wt. % and about 0.5 wt. %.

Additional Functional Ingredients

The components of the antimicrobial multi-purpose compositions can further be combined with various additional functional components. The functional ingredients provide desired properties and functionalities to the compositions. For the purpose of this application, the term "functional ingredient" includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional ingredients may be used. In certain embodiments one or more of the following additional functional ingredients may be preferred, defoamers, foaming agents, coupling agents, fragrances and/or dyes, additional surfactants, rheology modifiers or thickeners, hydrotropes, chelating/sequestering agents, and the like. For a concentrated composition, the additional optional ingredients are preferably added in an amount between about 0 wt. % and about 20 wt. %, more preferably between about 0.01 wt. % and about 15 wt. %, most preferably between about 0.01 wt. % and about 12 wt. %. For a ready-to-use composition, the additional optional ingredients are preferably added in an amount between about 0 wt. % and about 10 wt. %, more preferably between about 0.01 wt. % and about 10 wt. %, most preferably between about 0.01 wt. % and about 5 wt. %.

Defoaming Agents

Preferably, the compositions do not include a defoaming agent; however, in some preferred embodiments the compositions can be low-foaming in which case a defoaming agent can be included. Generally, defoamers which can be used in accordance with the invention preferably include alcohol alkoxylates and EO/PO block copolymers. Defoamers can also include polyalkylene glycol condensates and propyl glycols, including polypropyl glycol. In some embodiments, the compositions can include antifoaming agents or defoamers which are of food grade quality given the application of the methods. To this end, one of the more effective antifoaming agents includes silicones. Silicones such as dimethyl silicone, glycol polysiloxane, methylphenol polysiloxane, trialkyl or tetralkyl silanes, hydrophobic silica defoamers and mixtures thereof can all be used in defoaming applications. In some embodiments, the defoamer can comprise a mineral oil.

In a preferred embodiment, the concentrated antimicrobial multi-purpose composition comprises between about 0 wt. % and about 10 wt. %, more preferably between about 0.01 wt. % and about 7 wt. %, and most preferably between about 0.01 wt. % and about 5 wt. % of a defoaming agent. In a preferred embodiment, the ready-to-use antimicrobial multi-purpose composition comprises between about 0 wt. % and about 2 wt. %, more preferably between about 0.01 wt. % and about 1 wt. %, and most preferably between about 0.01 wt. % and about 0.5 wt. % of a defoaming agent.

Additional Surfactants

The compositions of the present application may optionally include one or more additional surfactants. The one or more additional surfactants may comprise anionic, nonionic, amphoteric, and/or zwitterionic surfactants. In a preferred embodiment, the concentrated antimicrobial multi-purpose composition comprises between about 0 wt. % and about 20 wt. %, more preferably between about 0.01 wt. % and about 15 wt. %, and most preferably between about 0.01 wt. % and about 10 wt. % of an additional surfactant. In a preferred embodiment, the ready-to-use antimicrobial multi-purpose composition comprises between about 0 wt. % and about 10 wt. %, more preferably between about 0.01 wt. % and about 5 wt. %, and most preferably between about 0.01 wt. % and about 3 wt. % of an additional surfactant.

Nonionic Surfactants

Suitable nonionic surfactants suitable for use with the compositions of the present invention include alkoxylated surfactants. Suitable alkoxylated surfactants include EO/PO copolymers, capped EO/PO copolymers, alcohol alkoxylates, capped alcohol alkoxylates, mixtures thereof, or the like. Suitable alkoxylated surfactants for use as solvents include EO/PO block copolymers, such as the Pluronic and reverse Pluronic surfactants; alcohol alkoxylates, such as Dehypon LS-54 (R-$(EO)_5(PO)_4$) and Dehypon LS-36 (R-$(EO)_3(PO)_6$); and capped alcohol alkoxylates, such as Plurafac LF221 and Tegoten EC11; mixtures thereof, or the like. In a preferred embodiment, the nonionic surfactant is Pluronic F127.

Amphoteric Surfactants

Amphoteric, or ampholytic, surfactants contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge. Due to the pH of the system, it was found that many amphoteric surfactants, particularly those based on a carboxylic acid, were incompatible. In particular, it was found that the protonated portion of the carboxylic acid based amphoteric surfactants will complex with the anionic surfactant causing precipitation. Thus, limited amphoteric surfactants were found to be compatible with the system. Preferred amphoteric surfactants which can be included have a sulfate or sulfonate group.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia" Cosmetics & Toiletries, Vol. 104 (2) 69-71 (1989), which is herein incorporated by reference in its entirety. The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine Commercial amphoteric surfactants are derivatized by subsequent hydrolysis and ring-opening of the imidazoline ring by alkylation—for example with chloroacetic acid or ethyl acetate. During alkylation, one or two carboxy-alkyl groups react to form a tertiary amine and an ether linkage with differing alkylating agents yielding different tertiary amines Long chain imidazole derivatives having application in the present invention generally have the general formula:

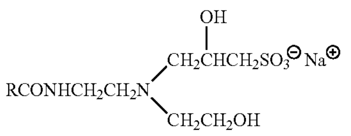

AMPHOTERIC SULFONATE wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: Cocoamphopropyl-sulfonate.

Zwitterionic Surfactants

Zwitterionic surfactants can be thought of as a subset of the amphoteric surfactants and can include an anionic charge. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion; and an alkyl group. Zwitterionics generally contain cationic and anionic groups which ionize to a nearly equal degree in the isoelectric region of the molecule and which can develop strong" inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate.

Sultaine surfactants are exemplary zwitterionic surfactants for use herein. A general formula for these compounds is:

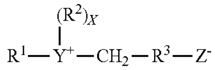

wherein $R^1$ contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of sulfonate, sulfate, phosphonate, and phosphate groups.

Examples of zwitterionic surfactants having the structures listed above include: 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane-1-phosphate; 3-[N,N-dipropyl-N-3-dodecoxy-2-hydroxypropyl-ammonio]-propane-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 3-[S-ethyl-S-(3-dodecoxy-2-hydroxypropyl)sulfonio]-propane-1-phosphate; 3-[P,P-dimethyl-P-dodecylphosphonio]-propane-1-phosphonate; and S[N,N-di(3-hydroxypropyl)-N-hexadecylammonio]-2-hydroxy-pentane-1-sulfate. The alkyl groups contained in said detergent surfactants can be straight or branched and saturated or unsaturated.

Sultaines useful in the present invention include those compounds having the formula $(R(R^1)_2\ N^+\ R^2SO^{3-}$, in which R is a $C_6$-$C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references is herein incorporated in their entirety.

In an embodiment, the compositions of the present invention include a betaine. For example, the compositions can include cocoamido propyl betaine.

Additional Anionic Surfactant

The antimicrobial multi-purpose compositions can optionally further comprise an additional anionic surfactant. Additional anionic surfactants can include anionic carboxylate surfactants, those which have a carboxylic acid or an alpha hydroxyl acid group. Anionic carboxylate surfactants suitable for use in the present compositions include carboxylic acids (and salts), such as alkanoic acids (and alkanoates), ester carboxylic acids (e.g. alkyl succinates), ether carboxylic acids, and the like. Such carboxylates include alkyl ethoxy carboxylates, alkyl aryl ethoxy carboxylates, alkyl polyethoxy polycarboxylate surfactants and soaps (e.g. alkyl carboxyls). Secondary carboxylates useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylgluamates, acyl peptides, sarcosinates (e.g. N-acyl sarcosinates), taurates (e.g. N-acyl taurates and fatty acid amides of methyl tauride), and the like.

Suitable anionic surfactants include alkyl or alkylaryl ethoxy carboxylates of the following formula:

$$R—O—(CH_2CH_2O)_n(CH_2)_m\text{-}CO_2X \quad (3)$$

in which R is a $C_8$ to $C_{22}$ alkyl group or

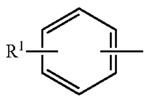 , in which $R^1$ is a $C_4$-$C_{16}$ alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a $C_8$-$C_{16}$ alkyl group. In some embodiments, R is a $C_{12}$-$C_{14}$ alkyl group, n is 4, and m is 1.

In other embodiments, R is

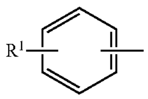

and $R^1$ is a $C_6$-$C_{12}$ alkyl group. In still yet other embodiments, $R^1$ is a $C_9$ alkyl group, n is 10 and m is 1.

Such alkyl and alkylaryl ethoxy carboxylates are commercially available. These ethoxy carboxylates are typically available as the acid forms, which can be readily converted to the anionic or salt form. Commercially available carboxylates include, Neodox 23-4, a $C_{12-13}$ alkyl polyethoxy (4) carboxylic acid (Shell Chemical), and Emcol CNP-110, a $C_9$ alkylaryl polyethoxy (10) carboxylic acid (Witco Chemical). Carboxylates are also available from Clariant, e.g. the product Sandopan® DTC, a $C_{13}$ alkyl polyethoxy (7) carboxylic acid.

In a preferred embodiment, the compositions can comprise sodium xylene sulfonate, sodium cumene sulfonate, potassium naphthalene sulfonate, or a mixture thereof, which may provide both surfactant and hydrotrope properties.

In an embodiment, the compositions are optionally free of anionic carboxylate surfactants.

Chelants

The compositions and methods can optionally include a chelant. As used herein chelants are compounds capable of coordinating (i.e. binding) metal ions commonly found in hard or natural water to prevent the metal ions from interfering with the action of the other detersive ingredients of an antimicrobial multi-purpose composition.

Suitable chelants can comprise an organic water conditioning agent including polymeric and small molecule water conditioning agents. Organic small molecule water conditioning agents are typically organocarboxylate compounds or organophosphate water conditioning agents. Polymeric inhibitors commonly comprise polyanionic compositions such as polyacrylic acid compounds. More recently the use of sodium carboxymethyl cellulose as an antiredeposition agent was discovered. This is discussed more extensively in U.S. Pat. No. 8,729,006 to Miralles et al., which is incorporated herein in its entirety.

Preferred small molecule organic water conditioning agents include, but are not limited to: sodium gluconate, sodium glucoheptonate, N-hydroxyethylenediaminetriacetic acid (HEDTA), ethylenediaminetetraacetic acid (EDTA), nitrilotriacetic acid (NTA), diethylenetriaminepentaacetic acid (DTPA), ethylenediaminetetraproprionic acid, triethylenetetraaminehexaacetic acid (TTHA), and the respective alkali metal, ammonium and substituted ammonium salts thereof, ethylenediaminetetraacetic acid tetrasodium salt (EDTA), nitrilotriacetic acid trisodium salt (NTA), ethanoldiglycine disodium salt (EDG), diethanolglycine sodium-salt (DEG), and 1,3-propylenediaminetetraacetic acid (PDTA), dicarboxymethyl glutamic acid tetrasodium salt (GLDA), methylglycine-N—N-diacetic acid trisodium salt (MGDA), and iminodisuccinate sodium salt (IDS). All of these are known and commercially available.

Preferred inorganic water conditioning agents include, but are not limited to, sodium tripolyphosphate and other higher linear and cyclic polyphosphates species. Suitable condensed phosphates include sodium and potassium orthophosphate, sodium and potassium pyrophosphate, sodium tripolyphosphate, and sodium hexametaphosphate. A condensed phosphate may also assist, to a limited extent, in solidification of the solid detergent composition by fixing the free water present in the composition as water of hydration. Examples of phosphonates included, but are not limited to: 1-hydroxyethane-1,1-diphosphonic acid, $CH_3C(OH)[PO(OH)_2]_2$; aminotri(methylenephosphonic acid), $N[CH_2PO(OH)_2]_3$; aminotri(methylenephosphonate), sodium salt (ATMP), $N[CH_2PO(ONa)_2]_3$; 2-hydroxyethyliminobis(methylenephosphonic acid), $HOCH_2CH_2N[CH_2PO(OH)_2]_2$; diethylenetriaminepenta(methylenephosphonic acid), $(HO)_2POCH_2N[CH_2CH_2N[CH_2PO(OH)_2]_2]_2$; diethylenetriaminepenta(methylenephosphonate), sodium salt (DTPMP), $C_9H_{28-x}N_3Na_xO_{15}P_5$ (x=7); hexamethylenediamine(tetramethylenephosphonate), potassium salt, $C_{10}H_{28-x}N_2K_xO_{12}P_4$ (x=6); bis(hexamethylene)triamine (pentamethylenephosphonic acid), $(HO_2)POCH_2N[(CH_2)_6N[CH_2PO(OH)_2]_2]_2$; and phosphorus acid, $H_3PO_3$. A preferred phosphonate combination is ATMP and DTPMP. A neutralized or alkaline phosphonate, or a combination of the phosphonate with an alkali source before being added into the mixture such that there is little or no heat or gas generated by a neutralization reaction when the phosphonate is added is preferred.

In an embodiment, the antimicrobial multi-purpose compositions can be substantially free of phosphates and/or phosphonates.

In addition to aminocarboxylates, which contain little or no NTA, water conditioning polymers can be used as non-phosphorous containing builders. Exemplary water conditioning polymers include, but are not limited to: polycarboxylates. Exemplary polycarboxylates that can be used as builders and/or water conditioning polymers include, but are not limited to: those having pendant carboxylate ($—CO_2^-$) groups such as polyacrylic acid, maleic acid, maleic/olefin copolymer, sulfonated copolymer or terpolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, and hydrolyzed acrylonitrile-methacrylonitrile copolymers. For a further discussion of chelating agents/sequestrants, see Kirk-Othmer, Encyclopedia of Chemical Technology, Third Edition, volume 5, pages 339-366 and volume 23, pages 319-320, the disclosure of which is incorporated by reference herein.

Methods of Use

The antimicrobial multi-purpose compositions provide antimicrobial efficacy when in contact with a microbial population. The compositions are also effective at removal of soils form a surface. Thus, the compositions can be used to clean a surface that is soiled and/or having a microbial population.

The methods of use for antimicrobial, including antiviral, disinfection along with inactivating viruses, include a contacting step, wherein the antimicrobial multi-purpose compositions disclosed herein are applied to a surface in need of treatment. In an embodiment, the contacting may involve contacting the antimicrobial multi-purpose composition with a food contact and/or non-food contact hard surface. Such surfaces can further include instruments, such as medical instruments. Surfaces can also include those cleaned in third-sink sanitizing, including various wares. In still further aspects, contacting the composition can be to a CIP (clean in place) application. In still further aspects, contacting the composition may be contacting the composition with a ware wash machine, such as a ware wash application. Such surfaces can include soft surfaces, ware, and/or hard surfaces. Preferred surfaces can comprise one or more of a bath, a carpet, a container, a counter, a curtain, a door, a door handle, a drain, a fabric, a floor, a fluid tank, a hospital partition, a mirror, a monitor, a pipe, a rail, a shower, a sink, a textile, a thermostat, a touch screen, an upholstery, a wall, a window, a woven surface, and a non-woven surface.

The various surfaces to which the compositions can be applied can include any conventional application means. Suitable applications can include, for example, by wiping, spraying, pouring, mopping, dipping, immersing, or the like. The contacting step allows the composition to contact the surface for a predetermined amount of time. The amount of time can be sufficient to allow, including from a few seconds to an hour, from about 30 seconds to about 15 minutes, or any range therebetween. The methods may comprise a single step of applying the composition onto the surface without direct physical removal, such as a rinse step. In an embodiment, the compositions can be on a wipe such that the wipe can be applied to a surface.

In some aspects, the methods can further include a pre-cleaning step, such as where a antimicrobial multi-purpose compositions is applied, wiped and/or rinsed, and thereafter followed by the applying of the compositions. The compositions and methods of use thereof can include treating cleaned or soiled surfaces.

In a preferred embodiment, the methods can remove at least about 40% soil on a surface, more preferably at least about 50% soil on a surface, still more preferably at least about 65% soil on a surface, most preferably at least about 75% soil on a surface. In an embodiment applied to oily, hydrophobic, and/or industrial soils, the methods can remove at least about 40% of the soil, more preferably at least about 50% of the soil, most preferably at least about 60% of the soil. In an embodiment applied to proteinaceous, starchy, fatty, and/or food soil, the methods can remove at least about 70% of the soil, more preferably at least about 75% of the soil, most preferably at least about 80% of the soil.

In a preferred embodiment, the methods and compositions can provide a log reduction of a bacteria and/or virus after a contact time with a surface soiled with the bacteria and/or virus after at least about 15 seconds, 30 seconds, 45 seconds, 60 seconds, 75 seconds, 90 seconds, 120 seconds, 150 seconds, 180 seconds or more. Preferably the compositions are in contact with a surface for at least about 60 seconds. In a preferred embodiment, the compositions provide at least about a 3 log reduction and inactivate a virus after 60 seconds of contact, more preferably at least about a 3.5 log reduction, still more preferably at least about a 4 log reduction, even more preferably at least about a 5 log reduction, and most preferably about a 6 log reduction. In a preferred embodiment, the compositions provide at least about a 3 log reduction of a bacterial population after about 3 minutes of contact, more preferably at least about a 3.5 log reduction, still more preferably at least about a 4 log reduction, even more preferably at least about a 5 log reduction, and most preferably about a 6 log reduction.

In a preferred embodiment, the compositions are low streaking. In a more preferred embodiment, the compositions are non-streaking, i.e., leave no discernable streak to human vision.

Methods of Preparation

The antimicrobial multi-purpose compositions can be prepared by combining and mixing the components, including, the anionic surfactant, solvent, and other ingredients. The carrier can be added upon dilution of a concentrate or with the other components. The mixing can occur by any suitable means of mixing, including, for example, but not limited to, automatic or manual mixing and/or stirring. Optionally, the pH of the composition can be assessed and a pH adjuster and/or buffering agent can be added to adjust and/or maintain the pH to the desired pH.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

It should be understood that these Examples, while indicating certain embodiments of the invention, are given by way of illustration only and are non-limiting. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims. Materials used:

- BIO-SOFT® S-101: dodecylbenzene sulfonic acid, an exemplary anionic sulfonated surfactant, available from Stepan.
- DISSOLVINE® GL-47-S: tetrasodium N,N-bis(carboxymethyl)-L-glutamate, an exemplary aminocarboxylate chelant available from Akzo Nobel.
- Phenoxyethanol: an exemplary solvent, available from multiple commercial sources.
- TRILON® M: An aqueous solution of trisodium salt of methylglycinediacetic acid, an exemplary aminocarboxylate chelant available from BASF.

Exemplary Hard Surface Cleaner Compositions

Exemplary formulations of the present invention evaluated for hard surface cleaning are set forth below in Table 2.

TABLE 2

| | Formulation | | | | |
|---|---|---|---|---|---|
| Component | A | B1 | B2 | C | D |
| Water (Deionized) | 85 | 80 | q.s. | 75-85 | 75-85 |
| LAS | 10 | 10 | 10 | 5-15 | 5-15 |
| Phenoxyethanol | 5 | 5 | 4-5 | 1-5 | 1-5 |
| Aminocarboxylate | 0 | 5 | 5 | 1-5 | 1-5 |
| Acidic pH Modifier | 0 | 0 | 1-1.5 | 0 | 0 |
| Lubricant | 0 | 0 | 0 | 0 | 5 |

Example 1

Red and Black Soil Removal Test

A food soil containing protein was prepared from lard, oil, protein, and iron (III) oxide (for color) (an exemplary proteinaceous food soil referred to as "red soil" throughout the Examples). About 30 grams of lard was combined with about 30 grams of corn oil, about 15 grams of whole powdered egg, and about 1.5 grams of $Fe_2O_3$.

An exemplary industrial hydrocarbon-based oily soil (referred to as "black soil" throughout the Examples) was prepared with about 50 grams mineral spirits, about 5 grams mineral oil, about 5 grams motor oil, about 2.5 grams black pigment dispersion and about 37.5 grams bandy black clay was prepared.

Tiles soiled with red soil were prepared and tiles soiled with black soil were also prepared. The back, grooved sides of a plurality of 3"×3" white vinyl tiles were soiled with approximately 0.75 grams of the soils using a 3" foam brush. The tiles were allowed to dry at room temperature overnight. For the red soil, it is believed that this incubation period allowed the bonds holding the triglycerides and proteins together in the soil to begin to crystallize and interlink. The next day, the tiles were placed into a soaking tray containing about 200 grams of a test composition for about 1 minute for red soil and about 2 minutes for black soil.

The soil removal test was conducted using Gardco Washability Test Equipment Model D10V available from Paul N. Gardner Company Inc., using a synthetic sponge. The dry synthetic sponge was saturated with about 80 grams of the test compositions. The tiles were then placed into the Gardco with the grain of the tiles parallel to the direction of sponge travel. The tiles were scrubbed with about 2 pounds of pressure with the moistened synthetic sponge for 16 cycles, rotating the tiles 90 degrees every 4 cycles for a complete 360-degree rotation of the tiles for red soil and 40 cycles, rotating the tiles 90 degrees every 10 cycles for a complete 360-degree rotation of the tiles for black soil. The tiles were then rinsed with city water and dried overnight at room temperature. Hunter Lab L* reflectance values of the washed tiles were measured. The L* reflectance values are summarized in FIGS. 1-2. A higher reflectance value indicates better cleaning efficacy.

Figure 2:
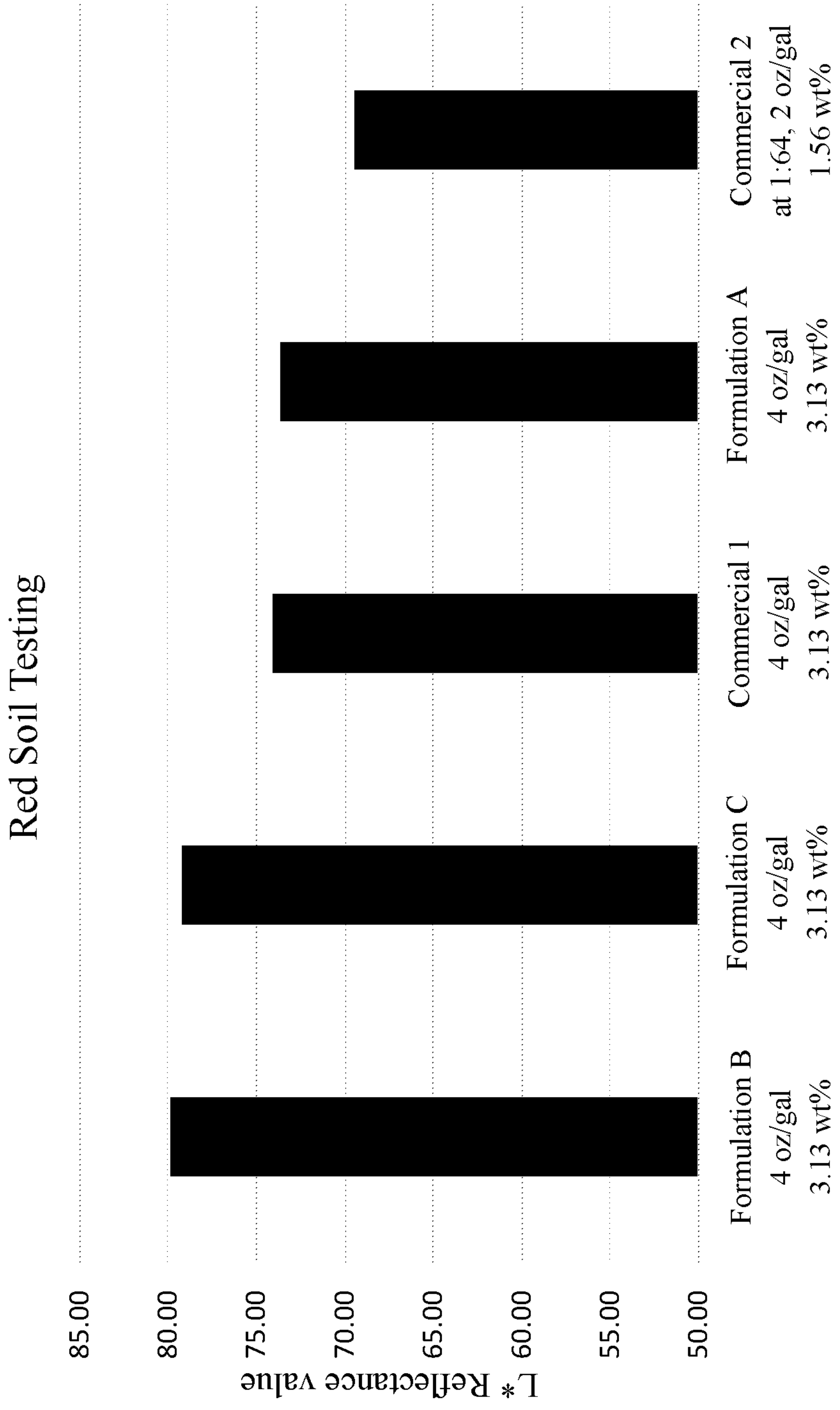
FIG. 2 is a graph comparing the assessing the cleaning performance of exemplary hard surface cleaner formulations of the invention on food soils.

FIG. 1 shows a graph comparing the black soil cleaning efficacy of exemplary hard surface cleaner formulations of the invention, Formulations A, B, and C, versus Commercial 1, an exemplary commercially available peroxide-based disinfectant, and against Commercial 2, an exemplary commercially available peroxide-based cleaner available from Diversey, Inc. FIG. 2 shows a graph comparing the red soil cleaning efficacy of the same formulations evaluated in FIG. 1. The figures show that the chelant-containing formulations performed better than the non-chelant formulations. Further, although Formulation A does not contain a chelant, it still performed better than the comparative commercially available peroxide-based compositions with respect to black soil cleaning efficacy, and maintained similar cleaning efficacy to Commercial 1 with respect to red soil cleaning efficacy. These results illustrate the suitability of the formulations of the invention for providing effective removal of hydrocarbon-based oily soils and proteinaceous food soils.

Example 2

Eye and Skin Irritation Screening

Eye and skin irritation screening was performed on several exemplary formulas using established EPA-accepted test methodology. The tests performed included OECD 437, the Bovine Corneal Opacity and Permeability Test (hereinafter "BCOP" eye irritation test), and OECD 492, the Reconstructed human Cornea-like Epithelium test (hereinafter "EpiOcular" eye irritation test). The BCOP test evaluates the eye hazard potential of a test chemical by measuring its ability to induce opacity and increased permeability in an isolated bovine cornea. These toxic effects to the cornea are therefore measured by: (1) decreased light transmission (opacity), and (2) increased passage of sodium fluorescein dye (permeability). The EpiOcular test evaluates the eye hazard potential of a test chemical based on its ability to induce cytotoxicity in a reconstructed human cornea-like epithelium tissue. The viability of the tissue following exposure to a test chemical is measured in comparison to tissues treated with a negative control substance.

Results for the eye irritation testing are provided below in Table 3. Current practice at the EPA is to use these results for skin irritation classification as well. Category 1 is the most hazardous rating, indicating chemicals inducing serious eye damage, while category 4 is the most benign. Category 3 and 4 do not require the use of personal protective equipment, providing improvement in how an end user handles the chemistry.

TABLE 3

| Formulation | BCOP Result | EpiOcular Result |
|---|---|---|
| A (concentrate) | Category 3 | Category 3 |
| A (use solution @ 6 oz/gal) | Category 3 | Category 3 |
| Exemplary Peroxide Disinfectant (concentrate) | Category 1 | N/A |
| Exemplary Peroxide Disinfectant (use solution @ 6 oz/gal) | Category 2B | N/A |

These results show that an exemplary hard surface cleaner formulation of the invention provides less eye and skin irritation compared to a comparative peroxide-containing disinfectant. The rating of category 3 further indicates that personal protective equipment is not required when handling formulations of the invention, whereas the comparative peroxide-containing disinfectant causes serious eye damage in concentrate form, and further cannot be used without personal protective equipment.

Example 3

Glass Streak Performance Test

Several formulations were evaluated for the amount of streaking or haze left after application of the various formulations on glass. A plurality of 12"×12" mirrors were rinsed and cleaned with deionized water and dried. Each mirror was divided into four, 3-inch sections with a permanent marker, and each section labeled to distinguish the various test formulations. A sheet of sterile gauze folded into about a ½ inch square, was doused using a disposable pipette with 1.0 gram of test formulation. The test formulation was then applied to the mirror by dragging the gauze pad in a vertical to horizontal motion. These steps were then repeated for each test formulation and allowing each applied test formulation to dry.

The minor panels were observed and rated after the solutions dried and after 24 hours.

The rating descriptions are provided in Table 4A, with a rating scale of 0-3, with 0 being the lowest streaking and 3 being highly visible streaks. This testing is specifically designed to add significant streaks to a surface for purposes of evaluating fine differences between products; it is not indicative of normal use on a surface. Thus, this testing and rating scale is a stringent and sensitive test; rating levels of 1 and 2 are not typically observable by the naked human eye (or may be visible with significant human examination and focus). The results are provided in Table 4B.

TABLE 4A

| Rating | Description |
|---|---|
| 0 | Absolutely no streaks visible |
| 1 | Streaks that are barely visible |
| 2 | Streaks that are clearly visible |
| 3 | Streaks that are so visible and numerous, that they distract from the reflected image |

TABLE 4B

| Formulation | Water | Dilution | Number of Applications | Rating | Comments |
|---|---|---|---|---|---|
| Commercial 1 | 17 gr | 4 oz/gal | 2 | 3 | Worst - Very streaky, lots of cloudiness |
| A | 17 gr | 4 oz/gal | 2 | 2 | Good - Streaks seen on edge of wipe, but clear in the middle |
| B | 17 gr | 4 oz/gal | 2 | 2 | Good - Streaks seen on edge of wipe, but clear in the middle |
| C | 17 gr | 4 oz/gal | 2 | 2 | Great - Streaks seen on edge of wipe, but clear in the middle |
| D | 17 gr | 4 oz/gal | 2 | 1 | Best - Streaks barely visible |

The results shown in Table 4B reflect that the exemplary hard surface cleaners of the invention all outperform an exemplary commercially available peroxide-based disinfectant with respect to the amount of streak left on glass.

Example 4

Germicidal Spray Test

Germicidal Spray testing was conducted following AOAC 961.02 to assess the effectiveness of spray products as disinfectants for use on contaminated hard surfaces. Test cultures of *Staphylococcus aureus* and *Pseudomonas aeruginosa* were prepared. A plurality of 18 mm×36 mm glass slides were prepared as carriers. Carriers were cleaned by rinsing with 95% ethanol, rinsing in deionized water, and allowed to air dry. The dried carriers were then autoclave sterilized in glass petri dishes matted with two pieces of filter paper. One carrier was used per Petri dish. Carriers may be sterilized in a hot air oven for ≥2 hours at ≥180° C. or in an autoclave steam cycle for 20 minutes with a drying cycle. Alternatively, appropriately validated test cycles for sterilization may be used.

Test formulations were prepared less than or equal to 3 hours prior to use. If the test substance required dilution, ≥1.0 mL or ≥1 g of test substance was used to prepare the use solution. Carrier was inoculated with the *S. aureus* culture or *P. aeruginosa* culture and spread uniformly on the carrier. The Petri dish was then covered and allowed to dry for 30-40 minutes at 35±2° C. Carriers were used within two hours of drying.

The inoculated carriers were then sprayed with the test formulations at regular intervals. Each carrier was held in a horizontal position for the duration of the specified exposure time. Excess test formulation was then drained off and each carrier was transferred to individual test tubes containing 20 mL of appropriate subculture medium to achieve neutralization and support growth. The test tubes were shaken thoroughly immediately after transfer and allowed to incubate.

Each tube was observed after incubation for absence or presence of organism growth. The results are recorded as number of negative tubes per number of tubes tested. Any positive growth tubes were gram stained to check for contamination. The EPA performance standard for a disinfectant requires the product to kill the test organisms on at least 59 out of 60 carriers. This standard is listed in the U.S. EPA Office of Chemical Safety & Pollution Prevention 810.2200. For positive subculture tubes, additional verification procedures would need to be applied. The results of the Germicidal Spray Test are shown in Table 5.

TABLE 5

| Formulation | Test Organisms | Contact time (minutes) | Carrier Control Result (log10) | Test Result (# of Negative/ Total) | Result |
|---|---|---|---|---|---|
| A (4 oz/gal dilution) | *S. aureus* | 5 | 6.16 | 60/60 | Pass |
| B (4 oz/gal dilution) | *S. aureus* | 5 | 6.08 | 60/60 | Pass |
| C (4 oz/gal dilution) | *S. aureus* | 5 | 6.06 | 60/60 | Pass |
| D (4 oz/gal dilution) | *S. aureus* | 5 | 6.20 | 59/60 | Pass |
| A (4 oz/gal dilution) | *Pseudomonas aeruginosa* | 5 | 5.69 | 59/60 | Pass |
| A (6 oz/gal dilution) | *Pseudomonas aeruginosa* | 3 | 6.38 | 60/60 | Pass |
| D (4 oz/gal dilution) | *Pseudomonas aeruginosa* | 5 | 5.78 | 60/60 | Pass |
| D (6 oz/gal dilution) | *Pseudomonas aeruginosa* | 3 | 5.77 | 59/60 | Pass |

The results of the Germicidal Spray Test show that the exemplary hard surface cleaner formulations of the present invention all passed the EPA performance standard by killing the test organisms on at least 59 out of 60 carriers. All formulations passed the test providing negative results for 59 out of 60 carriers.

Example 5

Additional Microbial Testing

Additional microbial testing was performed to compare the antimicrobial efficacy of an exemplary hard surface cleaner formulation of the present invention and an exemplary commercially available peroxide-based disinfectant. The additional testing performed included the Use Dilution Method (hereinafter "UDM") based on AOAC 955.15 and the Viricidal Assay based on ASTM E1053.

The UDM was prepared using carriers that were soaked in 1 N sodium hydroxide overnight. The carriers were rinsed thoroughly the next morning with tap water to remove any remaining NaOH, and sterilized. *Staphylococcus aureus* cultures were prepared according to ATCC 6538. Thereafter, 20 mL of the *S. aureus* culture was added to each test tube containing 20 carriers. Alternatively, up to 100 carriers may be placed in a larger sterile vessel. After a specified contact period, the inoculum is drained from the tube and the carriers placed on a Petri dish. The carriers are then placed in an incubator and allowed to dry.

Test formulations were prepared less than or equal to 3 hours prior to use. If the test substance requires dilution, ≥1.0 mL or ≥1.0 g of test substance is used to prepare the use solution. Soil may be added to the test system to simulate cleaning a soiled surface. Fetal bovine serum is used as a surrogate for environmental soil. If desired in the test system, fetal bovine serum is included at 5% of the total volume of the test substance. A 10 mL aliquot of test substance use solution was dispensed into a test tube. The tubes were placed in a water bath to allow the test solution to come to specified temperature. The carriers were sequentially transferred from the Petri dish to the test tubes containing the test formulations by adding one carrier per tube. Once the exposure time was completed, the carriers were removed and transferred into a subculture tube containing a neutralizer then incubated.

Each tube was observed after incubation for absence or presence of organism growth. The EPA performance standard for a disinfectant requires the product to kill the test organisms on at least 57 out of 60 carriers. For positive subculture tubes, additional verification procedures would need to be applied. The results of the UDM are shown in Table 6.

The Viricidal Assay was performed to evaluate antimicrobial solutions for viricidal efficacy on inanimate non-porous surfaces. The stock virus of feline calicivirus, a norovirus surrogate, was diluted to a titer of approximately 6-$\log_{10}$ infectious units per 0.1 ml. In addition, the virus sample was also loaded with organic soil present at 5 wt. % of the sample. The prepared FCV containing sample was then added to the test formulations and prepared at a ratio of one-part virus and 9-part test formulation. Various contact times were evaluated. After specified contact times, the test compositions and virus/soil samples were neutralized, placed in media, and allowed to incubate. After the close of the incubation period, the samples treated with the composition were examined and a log count of any remaining infectious viruses were quantified. The test product should demonstrate a greater than or equal to 3 log reduction in each surface in the presence or absence of cytotoxicity. The results of the Viricidal Assay are shown in Table 6.

TABLE 6

| Test Method | Organism | Contact Time | Hard water and soil | Formulation Commercial 1 | Formulation A |
|---|---|---|---|---|---|
| UDM | *S. aureus* | 10 min | 400 ppm hard water, 5% soil | Dilution: 6 oz/gal Result: Fail | Dilution: 6 oz/gal Result: Passed with 57/60 negative carriers. |
| Viricidal Assay | Feline Calicivirus (FCV, surrogate for norovirus) | 30 sec | 400 ppm hard water, 5% soil | Dilution: 6 oz/gal Result: Fail, didn't fully inactivate virus at 30 sec. | Dilution: 4 oz/gal Result: Fully inactivated virus at 30 sec. |

The results as shown in Table 6 indicate that the commercially available peroxide-based disinfectant failed both the UDM and Viricidal Assay, whereas the exemplary formulations of the present invention passed both tests and at lower concentrations. Additionally, it should be noted that the exemplary viricidal compositions demonstrated viricidal activity in the harsher conditions of soil and hard water. The presence of hard water and soil are both recognized to have a deleterious effect on cidal activity of compositions; thus, the effectiveness of the present compositions in such conditions is demonstrative of the compositions' robustness and persistence in difficult conditions.

The data in the foregoing examples demonstrates the suitability of the exemplary compositions for multipurpose cleaning due to their efficacy against a wide variety of microbes, including both bacteria and viruses. This is an improvement over the existing cleaning compositions, which do not kill as diverse of microbes, streak surfaces such as glass, and provide less soil removal.

The inventions being thus described, it will be obvious that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

The inventions being thus described, it will be obvious that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. A concentrated multi-purpose cleaning composition comprising:

between about 1 wt. % and about 60 wt. % of an anionic sulfonated surfactant;

between about 1 wt. % and about 30 wt. % of a solvent having a less than 5% (wt./wt.) solubility in water, wherein the solvent comprises phenoxyethanol;

between about 0.1 wt. % and about 60 wt. % of a carrier;

between about 0.01 wt. % and about 10 wt. % of a chelant;

wherein the composition is free of alpha hydroxycarboxylic acids;

wherein the anionic sulfonated surfactant and solvent are in a ratio between about 3:1 and about 1:3;

wherein the composition has a pH of between about 0.5 and about 1.5; and wherein the composition is free of an alkaline pH modifier.

2. The composition of claim 1, wherein the composition has less than about 0.1 wt. % of a peroxide.

3. The composition of claim 1, wherein the solvent further comprises an aromatic alcohol, an aromatic glycol ether, an alkylene glycol ether, or a mixture thereof.

4. The composition of claim 1, wherein the solvent further comprises benzyl alcohol, a phenoxypropanol, dipropylene glycol n-butyl ether, tripropylene glycol butyl ether or a mixture thereof.

5. The composition of claim 4, wherein the composition has a pH between about 2 and about 3.2 when diluted for use.

6. The composition of claim 1, wherein the anionic sulfonated surfactant comprises a C8-C22 alkylbenzene sulfonic acid, sulfonated oleic acid, secondary alkane sulfonate, a sulfosuccinate, or mixture thereof.

7. The composition of claim 1, wherein the composition further comprises a buffering agent, a lubricant, a coupling agent, a defoaming agent, a dye, a fragrance, a foaming agent, a hydrotrope, a pH adjusting agent, a solubilizer, an additional surfactant, a wetting agent, or mixture thereof.

8. The composition of claim 7, wherein the lubricant is in a concentration of between about 1 wt. % and about 20 wt. % and comprises glycerin, propylene glycol, or mixture thereof.

9. A method of cleaning a surface comprising:

contacting a surface with the composition of claim 1.

10. The method of claim 9, wherein the contacting is performed by wiping, spraying, pouring, mopping, or a combination thereof.

11. The method of claim 9, wherein the surface is a bath, a carpet, a container, a counter, a curtain, a door, a door handle, a drain, a fabric, a floor, a fluid tank, a hospital partition, a mirror, a monitor, a pipe, a rail, a shower, a sink, a textile, a thermostat, a touch screen, an upholstery, a wall, a window, a woven surface, a non-woven surface, or a combination thereof.

12. The method of claim 9, wherein the composition is in contact with the surface for at least 60 seconds, and wherein the composition provides at least about a 3 log reduction and inactivates a virus after about 60 seconds and/or provides at least about a 3.5 log reduction in a bacterial population after about 3 minutes.

13. The method of claim 9, wherein the composition further comprises a lubricant in a concentration of between about 1 wt. % and about 20 wt. % and is selected from the group consisting of glycerin, propylene glycol, or mixture thereof.

14. The method of claim 9, wherein the composition leaves no visible streaking when applied to the surface.

15. The method of claim 9, wherein the contacting is performed by a wipe saturated with the composition.

16. The method of claim 15, wherein the wipe comprises a paper or cloth substrate.

17. The composition of claim 1, wherein the composition is saturated upon a wipe.

* * * * *